J. & T. HOPE & H. LE FAVOUR.
MACHINE FOR ENGRAVING CALICO PRINTER'S ROLLERS.
No. 3,849. Reissued Feb. 22, 1870.
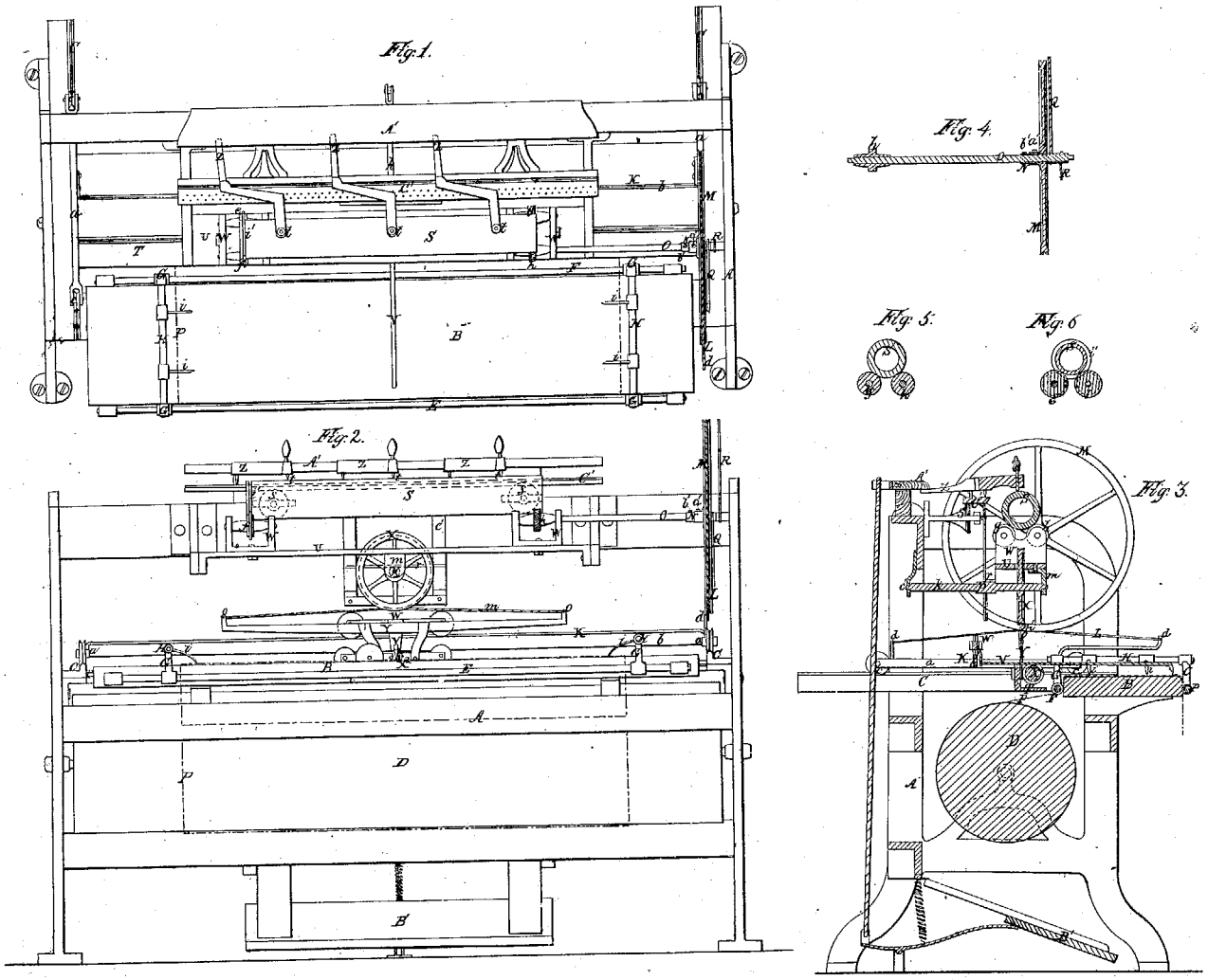

United States Patent Office.

JOHN HOPE, THOMAS HOPE, AND HEBER LE FAVOUR, OF PROVIDENCE COUNTY, RHODE ISLAND, ASSIGNEES, BY MESNE ASSIGNMENTS, OF JOHN HOPE AND THOMAS HOPE.

*Letters Patent No.* 13,462, *dated August* 21, 1855; *extended seven years*; *reissue No.* 3,849, *dated February* 22, 1870.

MACHINE FOR ENGRAVING CALICO-PRINTERS' ROLLERS.

The Schedule referred to in these Letters Patent and making part of the same

*To all whom it may concern:*

Be it known that JOHN HOPE and THOMAS HOPE, of the city and county of Providence, in the State of Rhode Island, have invented an Improved Machine for Engraving the Surface of a Calico-Printers' Roller, preparatory to its being etched; and it is hereby declared that the following specification, taken in connection with the drawings making a part of the same, is a full, clear, and exact description thereof.

Of said drawings—

Figure 1 denotes a top view of the said machine.

Figure 2 is a front elevation of it.

Figure 3 is a vertical central, and transverse section of it.

A in the drawings is its frame, such having applied to it a plane table or platform, B, and two horizontal and parallel V-rails, C C, as seen in figs. 1, 2, and 3.

Below the said rails there is supported in the frame a large roller or drum, D, around which the sheet of pattern-cloth or paper on which the design is drawn is to be wound, it being extended therefrom upward to the adjacent edge of the table B, thence over the top of said table, and down between the front edge of the table and the holdback or rod E, arranged along said front edge of the table, as seen in the drawings, wherein the said pattern-cloth is represented in line marked P.

Another such holdback or rod, F, is applied to the rear edge of the table, each of said rods being made to carry two posts or uprights, G G, which slide freely upon them in longitudinal directions.

Above the table are two rods, H H, which extend horizontally over and transversely across it, and are respectively supported by said posts.

These rods carry measuring-points or markers *i*, there being two of such points or markers to each of the rods, and each being adapted to it, so as to be capable of being slid and turned thereupon. If desirable, a clamping-screw may be applied to each of the markers and posts, in order to confine such in its position on the rod.

On the rails C C there is a carriage, K, formed of two parallel bars, *a a*, connected by means of a long rail or bar, *b*, said carriage being supported on rollers or wheels, as seen at *c c*.

A cord or band, L, connected at its two ends to two standards, *d d*, of the carriage K, passes around a large grooved wheel or pulley, M, which is fixed upon a tubular shaft, N, supported on a shaft, O. Said shaft O has an index arm, R, affixed to it, and extended outward from it toward the grooved wheel M.

Another such index arm, Q, is attached to the shaft N, and extends outward and to the side of the rim of the wheel M.

Figure 4 is a section taken through the shafts O N, the wheel M, and the arms Q and R.

The wheel M may turn with friction upon the shaft N, or it may have a set-screw, *a'*, applied to it, by which it may be affixed thereto if necessary.

So in regard to the shaft N, it should turn with friction on the shaft O, or have a set-screw, *b'*, applied to it by which it may be clamped to the shaft The object of the index-arms or indices Q R, so applied to the shafts O N and wheel M, will be hereinafter explained.

The shell or cylinder to be engraved is shown at S, as supported on two sets of rollers, *e f* and *g h*, one of which, viz, *h*, is fixed upon the shaft O.

In Figure 5 is represented a transverse section of the shell S and the rollers *g h*; while in Figure 6 is exhibited a similar section, taken through the rollers *e f*.

A set comprising two of these rollers supports each end of the shell or cylinder S, the rollers *e f* extending into a groove, *i'*, formed around the surface of the cylinder, close to its left end, such groove serving to prevent endwise or longitudinal movement of the cylinder. When the driving-wheel *h* is turned around on its axis it will produce a transverse rotary motion of the shell or cylinder upon it.

Sustained by the main frame A are two shelves, T U, which are arranged as seen in the drawings.

The shelf U supports the saddles W W of the rollers *e f g h*.

A projection, *m*, from the shelf U sustains one end of a shaft, *k*, of a grooved pulley, X, the opposite end of the shaft being supported in a similar projection, *e'*.

Underneath the said grooved pulley is a carriage, Y, whose wheels rest and turn upon the shelf T, or on suitable guides or rails applied thereto.

A band, *n'*, extending around the pulley X, has its ends fastened to arms *o o*, extended in opposite directions from the carriage Y, as seen in fig. 2.

V is a tracer which projects from a carriage, W, supported on the rail *b* of the carriage K, and rests in the grooved periphery of a wheel, $X^2$, sustained by the carriage Y. The point of the tracer projects over the table and upon the design carried thereby.

On the shaft *k* there is a small gear or wheel, *p*, upon which rests a horizontal bar or rack, *r*, affixed to the carriage C', which is supported on rollers, as denoted by dotted lines at *s s*, in fig. 2, one of said rollers being seen at *s*, in fig. 3.

The said carriage C' serves to support the internal levers Z Z Z of the gravers *t t*, the rear arms or tails of such levers extending underneath a rocker bar, A′, operated in the usual way by a foot-treadle, B′.

The object of the said rocker bar is to press downward the tails of the graver-levers or carriers, so as to cause the several gravers to be lifted off the varnished surface of the shell or cylinder S.

By laying hold of the tracer V, and moving it forward and backward, or, in other words, transversely of the machine, the carriage K will be put in motion on its rails, and by means of the band L will communicate motion to the wheel M, so as to rotate the shaft O, and of course produce a rotary movement of the cylinder or roller S.

The extent of movement of the surface of the cylinder S, in comparison to that of the carriage K, being in the ratio of the circumferences of the wheels *h* and M, when the tracer is used longitudinally of the table, it will produce a corresponding motion of the carriage Y, and of course an equal rotary movement of the periphery of the grooved wheel $X^2$, and consequently effect a longitudinal movement of the carriage C′, so as to move the several gravers in a longitudinal direction on the surface of the cylinder S, such movement, with respect to the movement of the tracers, being in the proportion which the diameter of the wheel *p* bears to that of the wheel $X^2$.

In constructing the machine we make the diameters of the wheels *p* and $X^2$ in the same proportion to each other as those of the wheels *h* and M, such proportions being those which exist between the dimensions of the pattern to be traced and those of the engraving on the surface of the cylinder.

In arranging the machine for operation the index-arms Q and R are disposed at an angle with each other equal to that measured by the arc through which the surface of the cylinder is moved while a section of the pattern is being engraved. Having effected the engraving of such section, it becomes necessary to draw forward the pattern-sheet a distance equal to another such section, which distance corresponds with that between either two marking points, *i i*, of each set thereof. Before this has been accomplished the marking point should be pressed downward upon the pattern-cloth, so as to mark it, or marks may be made upon it where they touch it. This having been done, the pattern-cloth should be moved forward so as to bring those marks which were previously under the rear markers, directly underneath the front markers.

Next, with a piece of chalk make marks on the side of the rim of the wheel M, where the index points Q R cross it. Next loosen the set-screw of the wheel M, so that it can revolve freely upon the shaft N, and draw the tracer forward to that part of the design upon which it rested previously to the pattern being moved as above described. While doing this, although the wheel M will be rotated upon its shaft, it will produce no rotation of the shaft O. Next the foot should be taken from the treadle, so as to throw the gravers off the cylinder. This having been done, the attendant takes hold of the arm R, and turns the shaft O until the arm comes up to the mark which was previously made where the arm Q rested against the wheel M. This movement of the shaft will have rotated the cylinder S the distance necessary for the engraving corresponding to the section of the pattern or design over which the tracer is next to be carried. After clamping the wheel M to the shaft N, and letting the gravers down upon the surface of the cylinder S, the machine will be ready for the tracer to be moved over a fresh section of the pattern.

While the markers or pointers serve as a ready means of determining the distance to which the pattern is to be moved after a section of it has been engraved, the rods *e f* operate as holdbacks or means of keeping the pattern-cloth firmly or properly strained upon the top surface of the table.

Although the machine above described for engraving the varnished surface of a roller is similar in many respects to other engraving or pantographic machines in use, it differs in several essential features therefrom, and especially in the general arrangement of its operative members or parts. By means of it any number of similar figures may be engraved on a cylinder by the use of a single pattern or corresponding figure, the number of such engravings depending on the number of gravers employed.

It will also be seen that in the machine described, the cylinder to be engraved is partially rotated during the operation of engraving, the several sections into which its surface is divided corresponding with the several sections of the pattern, by means of a driving-roller or wheel, *h*, the friction between whose surface and that of the surface of the shell against which it bears causes the motion of the latter to be communicated to the former. This arrangement is of great practical importance, and is essential to the proper operation of the machine, as will be seen when it is understood that after any one section of the pattern has been engraved it is necessary to rotate the cylinder, so as to bring a fresh section of its surface under the points of the gravers.

Before this invention, engraving-machines employed a flat roughened table, whose backward and forward movement through the friction of its surface against the surface of the shell caused the latter to be rocked on its axis during the operation of engraving; and to subject a fresh portion of the surface of the shell to the action of the gravers, it was necessary to raise it above the surface of the table, and after turning it the required distance, readjust it with the table—an operation too difficult to be performed without incurring the risk of so inaccurately engraving the shell as to produce misfits when it was applied to the printing-machine.

By the employment of a friction driving-roller, the shell being supposed to be supported upon suitable bearings, it is only necessary to disconnect the tracer from the mechanism which causes the shell to be rocked on its axis during the engraving operation, in order to rotate the shell for the distance requisite to bring up a fresh section of its surface, and this without disturbing the shell in its bearings.

Having thus described the invention, there is claimed—

1. The combination and arrangement of the two sets of measuring markers *i i i i*, the holdback rods E F, and roller, with the plane-surface table B, the same being not only to enable the design to be transferred, it being brought forward in regular sections, but to be maintained flatly upon the table, as described.

2. The two measuring indices Q R, in combination with the large pulley M and the shaft of the driving-roller of the cylinder to be engraved.

3. The means for giving a partial rotary motion to the shell or cylinder during the operation of engraving the same in a pantographic engraving-machine, which consists in the employment of a friction driving-roller, *h*, operated by a tracer, V, through intermediate suitable connecting mechanism, substantially as herein described.

4. In combination with suitable supports for preventing endwise or lateral movements of the shell or cylinder to be engraved, the employment of a friction driving-roller, *h*, for giving an axial motion to the cylinder during the operation of engraving, when such driving-roller is arranged so as to have a movement independent of the governing tracer, to admit at proper times of the extra rotation of the cylinder, to bring up a fresh section of its surface, substantially as herein described.

5. The arrangement of the pattern-table, the tracer, and its carriage, the several other carriages, the mechanism for operating each, the wheel M, its shaft, and the supports of the roller to be engraved, the whole constituting an important improvement in engraving machinery and securing to it important advantages in operation as well as in construction.

JOHN HOPE.
THOMAS HOPE.
HEBER LE FAVOUR.

Witnesses:
ORVILLE PECKHAM,
PETER F. HUGHES.